US011052463B2

(12) United States Patent
Aoyagi

(10) Patent No.: US 11,052,463 B2
(45) Date of Patent: Jul. 6, 2021

(54) TURRET TOOL POST

(71) Applicants: CITIZEN WATCH CO., LTD., Tokyo (JP); CITIZEN MACHINERY CO., LTD., Nagano (JP)

(72) Inventor: Atsushi Aoyagi, Tokyo (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 7 days.

(21) Appl. No.: 16/493,572

(22) PCT Filed: Jan. 19, 2018

(86) PCT No.: PCT/JP2018/001572
§ 371 (c)(1),
(2) Date: Sep. 12, 2019

(87) PCT Pub. No.: WO2018/168197
PCT Pub. Date: Sep. 20, 2018

(65) Prior Publication Data
US 2020/0206821 A1 Jul. 2, 2020

(30) Foreign Application Priority Data

Mar. 15, 2017 (JP) .............................. JP2017-050444

(51) Int. Cl.
*B23B 3/26* (2006.01)
*B23Q 16/10* (2006.01)
(Continued)

(52) U.S. Cl.
CPC ................ *B23B 3/26* (2013.01); *B23Q 16/10* (2013.01); *B23B 29/323* (2013.01); *B23Q 5/04* (2013.01);
(Continued)

(58) Field of Classification Search
CPC . B23B 2260/092; B23B 29/24; B23B 29/244; B23B 29/246; B23B 29/248;
(Continued)

(56) References Cited

U.S. PATENT DOCUMENTS 3,888,140 A * 6/1975 Mackelvie ............. B23Q 16/10
74/826
4,785,513 A * 11/1988 Lee ...................... B23Q 1/5406
29/40
(Continued)

FOREIGN PATENT DOCUMENTS

CN 105127758 A 12/2015
CN 105828996 A 8/2016
(Continued)

OTHER PUBLICATIONS

WO-2016013307-A1 Machine Translation, pp. 1-8 (Year: 2020).*
(Continued)

*Primary Examiner* — Nicole N Ramos
(74) *Attorney, Agent, or Firm* — Knobbe, Martens, Olson & Bear, LLP

(57) ABSTRACT

A turret tool post includes a turning part having a plurality of turret surfaces on which tools for machining a workpiece are mounted, the turning part being configured to select any one of the tools for use in the machining of the workpiece by turning; a non-turning part on which a laser head of a laser machining device different from the tool is mounted, the non-turning part being arranged inside the turning part, an optical fiber cable being connected to the laser head; and a cut part (machinable part) that allows machining by the laser head to the workpiece under a state in which the laser head is selected.

5 Claims, 7 Drawing Sheets

(51) Int. Cl.
*B23Q 5/04* (2006.01)
*B23B 29/32* (2006.01)

(52) U.S. Cl.
CPC ..... *B23Q 2220/002* (2013.01); *Y10T 29/5155* (2015.01)

(58) Field of Classification Search
CPC ....... B23B 29/32; B23B 29/34; B23B 29/323; B23B 3/26; B23Q 16/10; B23Q 2220/002; B23Q 5/04; Y10T 29/5155
See application file for complete search history.

(56) References Cited

U.S. PATENT DOCUMENTS

| | | | |
|---|---|---|---|
| 4,899,409 A | 2/1990 | Cox, Jr. | |
| 5,439,431 A * | 8/1995 | Hessbruggen | B23Q 37/00 483/14 |
| 6,609,441 B1 * | 8/2003 | Sugimoto | B23B 3/168 29/40 |
| 2006/0064861 A1 * | 3/2006 | Ishiguro | B23Q 39/02 29/40 |
| 2011/0035917 A1 * | 2/2011 | Shimizu | B23Q 39/024 29/39 |
| 2014/0033490 A1 * | 2/2014 | Shimizu | B23Q 5/10 29/40 |
| 2014/0059823 A1 * | 3/2014 | Frank | B23K 26/0093 29/39 |
| 2016/0250692 A1 * | 9/2016 | Suzuyama | B23B 29/323 29/40 |
| 2017/0023926 A1 | 1/2017 | Kijima et al. | |
| 2017/0129018 A1 * | 5/2017 | Ishihara | B23B 27/1692 |

FOREIGN PATENT DOCUMENTS

| | | | |
|---|---|---|---|
| DE | 19919645 A1 | 11/2000 | |
| EP | 1642676 A1 | 4/2006 | |
| JP | 51-064975 U | 5/1976 | |
| JP | H09-220680 A | 8/1997 | |
| JP | H 11-48058 A | 2/1999 | |
| JP | H11-90660 A | 4/1999 | |
| JP | 2014507296 A | 3/2014 | |
| WO | WO-2016013307 A1 * | 1/2016 | ............ B23B 3/168 |
| WO | WO 2017/006269 A1 | 1/2017 | |

OTHER PUBLICATIONS

Chinese Office Action dated Jan. 2, 2020; Application No. 201880007305.1; 9 pages total (including English translation).
Extended European Search Report for European Patent Application No. 18766762.1, dated Jun. 12, 2020, in 7 pages.
Decision to Grant a Patent for JP Application No. 2017-050444 dated Jun. 10, 2019.

* cited by examiner

TURRET TOOL POST

CROSS-REFERENCE TO RELATED APPLICATION

The present application is based on and claims priority to Japanese Patent Application No. 2017-050444, filed on Mar. 15, 2017, the disclosure of which is hereby incorporated by reference in its entirety.

TECHNICAL FIELD

This disclosure relates to a turret tool post.

BACKGROUND ART

A tool post for use in, for example, a lathe includes a turret tool post. The turret tool post includes a turret head that is turnably supported by a post body. A plurality of tools such as cutting tools and end mills are mounted on the turret head along a circumferential direction which is the turning direction of the turret head. A tool for use in machining of a workpiece is selected by turning the turret head (see JP3691570B, for example).

The tool mounted on the turret head contacts the workpiece to machine the workpiece. Machining variations can be expanded by additionally mounting special tools different from these tools. The special tools include, for example, a laser machining device (see JP3691570B, for example).

SUMMARY

In the laser machining device described in Patent Literature 1, a laser head, which is a machining body, is attached to a turning part similar to the other tools, and the laser head can be selected by turning the turning part.

When other special tools except the laser machining device are mounted, these tools may be attached to the turning part similar to the laser head. For example, in a high frequency spindle rotatable at a high speed, which is several hundred thousand revolutions per minute, a rotation part for rotating a tool is provided in a turning turret head.

It was necessary to turn the tool attached to the turning part of the turret head together with the turning of the turret head in the machining of the workpiece.

The present disclosure has been made in view of the above circumstances, and an object of the present disclosure is to provide a turret tool post capable of machining a workpiece without turning a machining body attached to a turret head.

The present disclosure provides a turret tool post including a turning part around which a plurality of tools for machining a workpiece are mounted, the turning part being configured to select any one of the tools by turning; and a non-turning part that is unturnable with respect to the turning part, on which a machining body of a machining device for machining the workpiece is mounted, the non-turning part being arranged inside the turning part, wherein the turning part is formed with a machinable part, the machinable part allowing the machining by the machining body under a state in which the machinable part is positioned in a predetermined position to the machining body by the turning of the turning part.

DESCRIPTION OF EMBODIMENT

Figure 1:
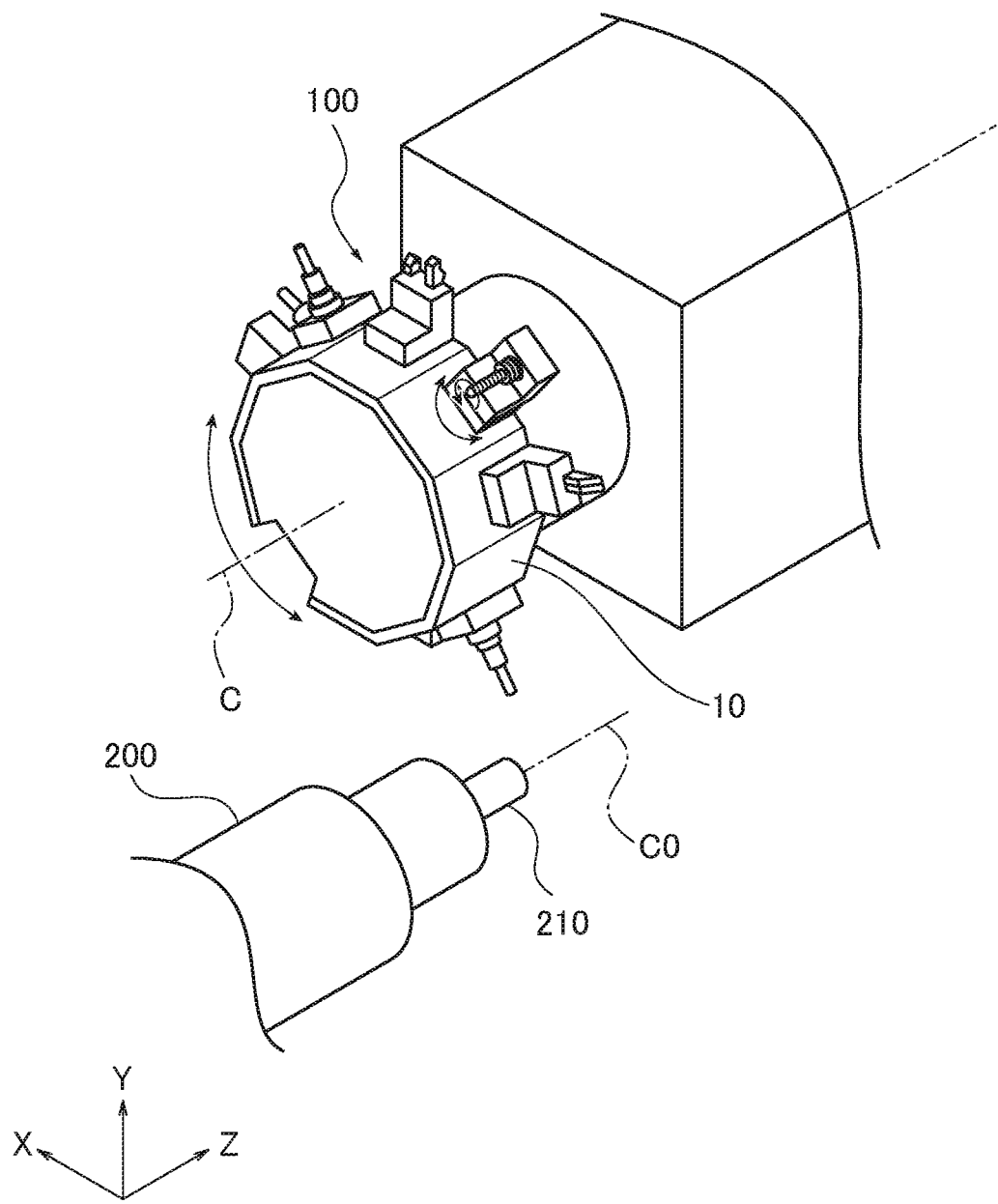
FIG. 1 is a schematic perspective view illustrating a turret tool post as one embodiment of the present disclosure.

Hereinafter, an embodiment of a turret tool post according to the present disclosure will be described. As illustrated in FIG. 1, for example, a turret tool post 100 of the present embodiment is used in combination with a main spindle 200 that grips a workpiece 210 in an automatic lathe. The turret tool post 100 is arranged to have a central axis C parallel to a central axis CO of the main spindle 200 (z-direction in FIG. 1).

Figure 2:
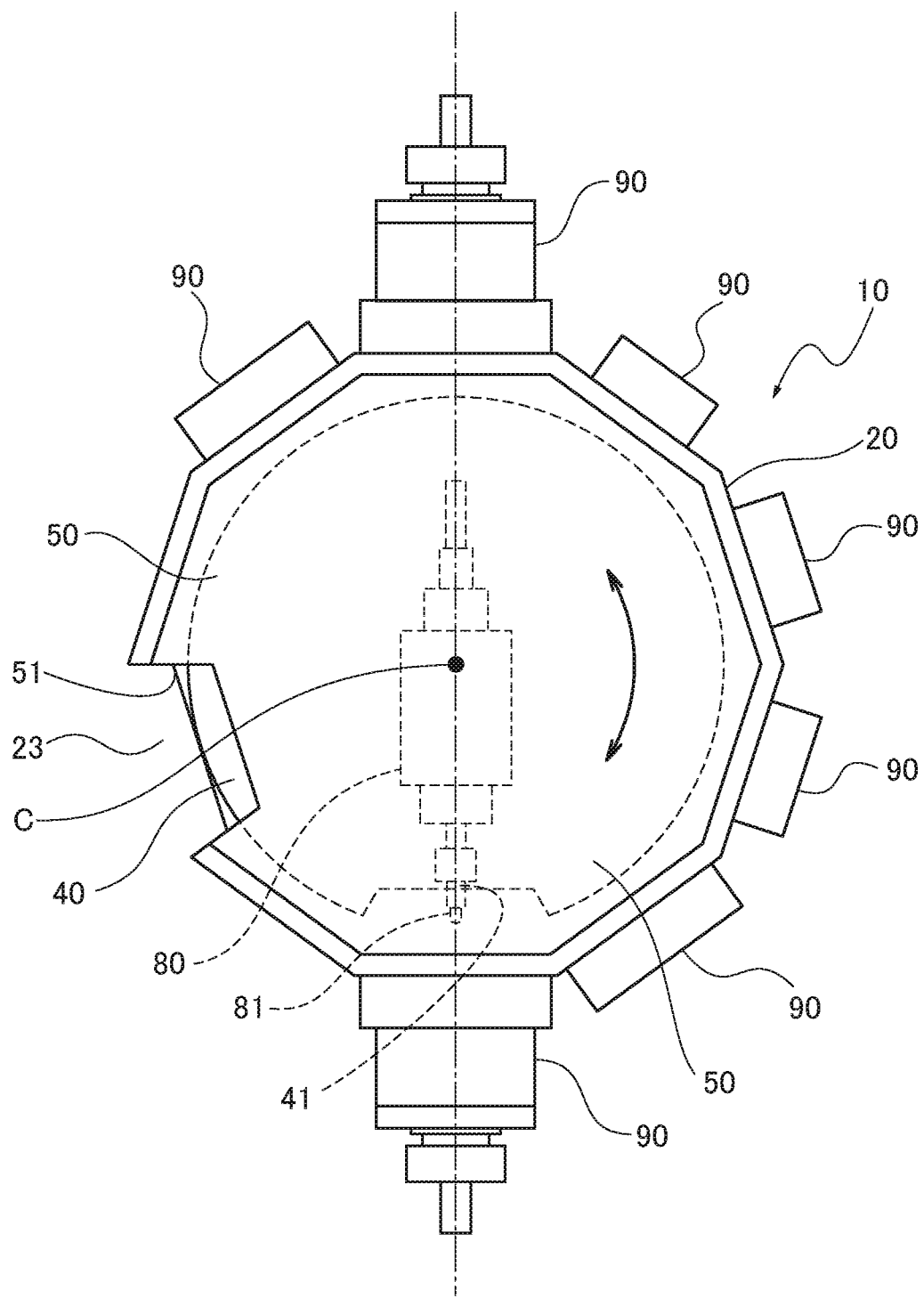
FIG. 2 is a front view of a turret head (when using tool) seen from a main spindle side of an automatic lathe.
Figure 3A:
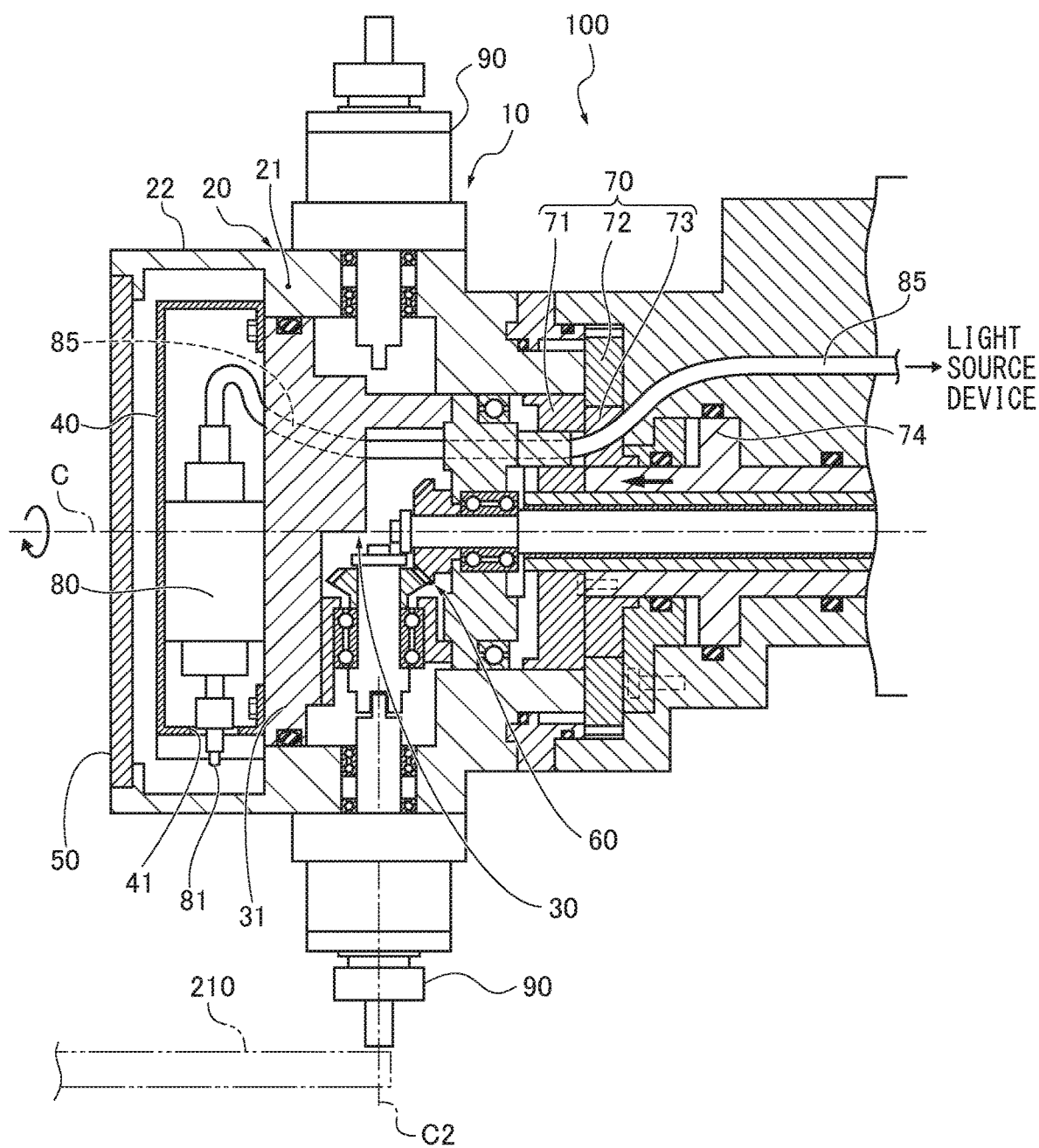
FIG. 3A is a sectional view of the turret head (when using tool (coupled state)) along a plane including a central axis.
Figure 3B:
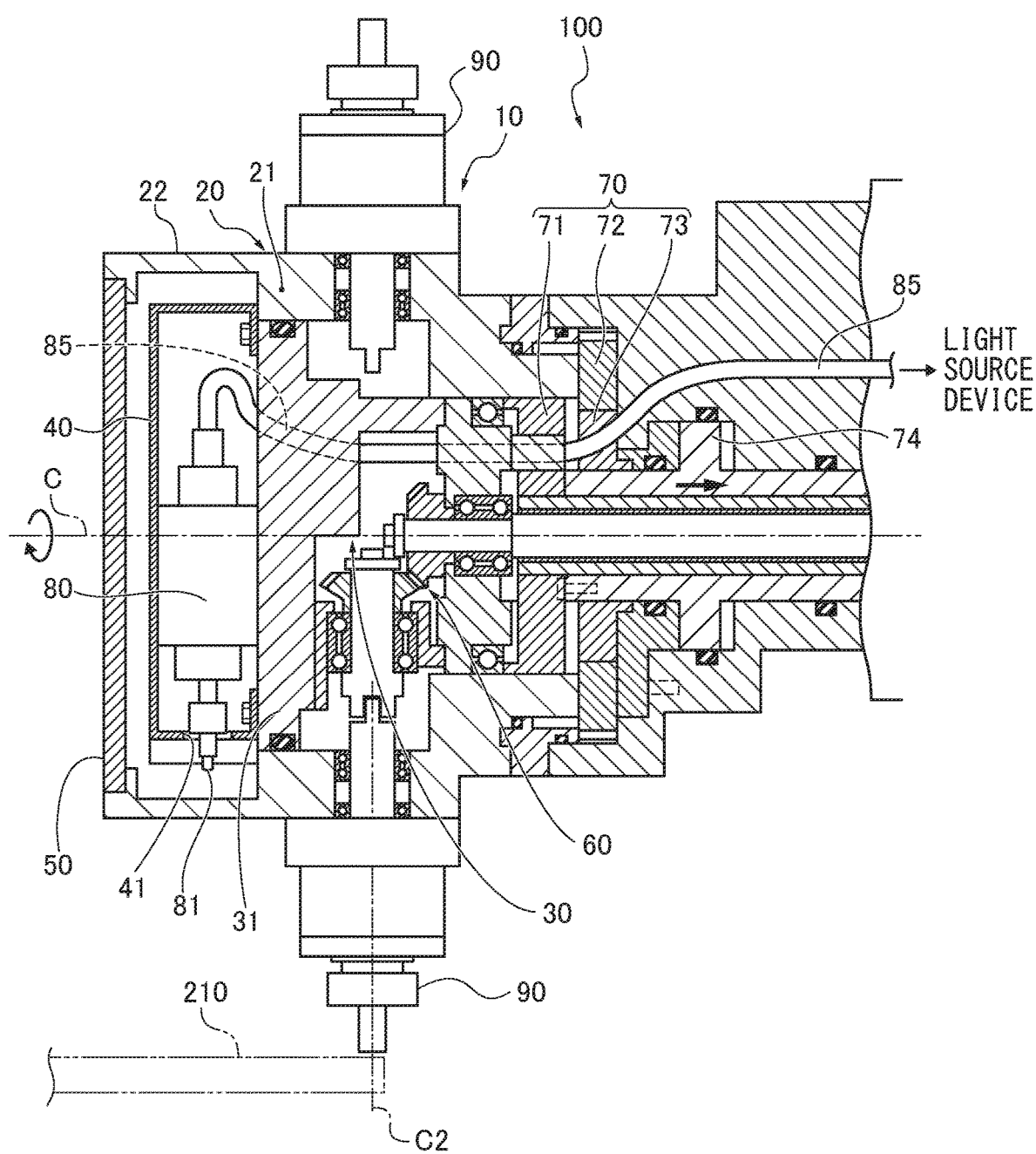
FIG. 3B is a sectional view of the turret head (when selecting tool (separated state)) along the plane including the central axis.

As illustrated in FIGS. 2, 3A, 3B, the turret tool post 100 includes a turret head 10 having, for example, a regular decagon in section. The turret head 10 includes a turning part 20, a non-turning part 30, and an end plate 50.

The turning part 20 includes an outer circumference wall part 21 arranged in an outer circumference of the turret head 10 and has a profile of a regular decagon in section. The outer circumference wall part 21 includes a plurality of turret surfaces 22 that forms an outer circumference surface of the outer circumference wall part 21. The turret surfaces 22 correspond to the respective sides of the regular decagon, respectively. Tools 90 are attached to the turret surfaces 22, respectively. Each tool 90 includes a machining part (blade for cutting or punching) that machines the workpiece 210 outside an outer surface of the outer circumference wall part 21. FIG. 2 illustrates only two tools 90 arranged in the vertical direction across the central axis C, and omits the tools 90 arranged in other directions. The turning part 20 is configured to be turnable about the central axis C. The turning part 20 turns only when a turning gear 72 rotates under a state in which a three-piece coupling ring 70 illustrated in FIGS. 3A, 3B is separated (refer to FIG. 3B), and does not turn under a state in which the three-piece coupling ring 70 is coupled (refer to FIG. 3A).

When a piston 74 illustrated in FIG. 3A moves in a left direction in the figure along the central axis C, an engagement piece 71, which is configured to be coupled with a fixed ring 73 and the turning gear 72, separates from the fixed ring 73 and the turning gear 72 (see FIG. 3B) in the three-piece coupling ring 70. The fixed ring 73 and the engagement piece 71 do not rotate, and the turning gear 72 rotates. The turning gear 72 thereby rotates about the central axis C in response to power from a not-shown another part. The turret head 10 turns by the rotation of the turning gear 72, so that any one of the tools 90 can be selected.

When a desired tool 90 is selected by turning the turret head 10, the rotation of the turning gear 72 is stopped. With this state, the piston 74 moves in a right direction in the figure along the central axis C. The engagement piece 71 is thereby coupled with the fixed ring 73 and the turning gear 72 (refer to FIG. 3A for coupled state). Through this coupling, the turning of the turning part 20 connected to the turning gear 72 is stopped.

The turret head 10 selects one tool 90 located in the lowest part in the figure from a plurality of tools 90 by turning the turning part 20 under a state in which the three-piece coupling ring 70 is separated (separated state). The one tool 90 is selected for machining the workpiece 210. The selected tool 90 engages with a transmission mechanism 60 that transmits a driving force from the turret tool post 100 to rotate about an axis C2. The selected tool 90 is not limited to a tool as a drill that engages with the transmission mechanism 60 to rotate about the axis C2, for example, and may be a tool as a cutting tool that disengages with the transmission mechanism 60 not to rotate.

After the tool 90 is selected, the turning part 20 is fixed by the coupling of the three-piece coupling ring 70. The turret tool post 100 moves in z-direction, y-direction (horizontal direction orthogonal to z-direction), and x-direction (vertical direction orthogonal to z-direction) illustrated in FIG. 1 other than the turning about the central axis C, so as to be positioned relative to the workpiece 210.

The outer circumference wall part 21 extends forward along the central axis C direction to be closer to the main spindle 200 than the part to which the tool 90 is attached. An opening part is provided in a part of the outer circumference wall part 21, which corresponds to one side of the regular decagon.

The non-turning part 30 is arranged inside the turning part 20 in the radial direction about the turning center (central axis C). The non-turning part 30 includes a fixed wall part 31 fixed to a non-turning part of the turret tool post 100. The fixed wall part 31 thus does not turn relative to the turning part 20. The fixed wall part 31 is arranged to intersect the central axis C. The fixed wall part 31 has a size smaller than a diameter of an inner surface of the turning part 20. The fixed wall part 31 does not contact the inner surface of the turning part 20 even when the turning part 20 turns. The fixed wall part 31 moves in z-direction, x-direction, and y-direction together with the turret head 10.

As illustrated in FIG. 3A, a laser head 80 (one example of machining body) of a laser machining device as one example of a machining device different from the tool 90 is attached to the fixed wall part 31. The laser head 80 includes, for example, a distal end part 81 (machining distal end part) facing downward. The laser head 80 is arranged in an inner region of the outer circumference wall part 21 in the radial direction, in particular, is arranged in front of the tool 90 in the central axis C direction. The laser head 80 has a size smaller than a diameter of an inner surface of the turning part 20, and does not contact the inner surface of the turning part 20 even when the turning part 20 turns.

An optical fiber cable 85 is connected to the laser head 80. The optical fiber cable 85 is fixed to a non-turning part inside the turret tool post 100 other than the fixed wall part 31. One end of the optical fiber cable 85 is connected to a light source device of the laser machining device and the other end of the optical fiber cable 85 is connected to the laser head 80, so as to guide laser light generated in the light source device. The laser head 80 and the optical fiber cable 85 are fixed in a non-turning part, which prevents the optical fiber cable 85 from being twisted even when the turning part 20 turns. The optical fiber cable 85 has a size smaller than a light guiding path that guides light in a space with a reflection mirror, and also prevents dust and waste from entering the light guiding path. The optical fiber cable 85 also has a high flexibility of routing.

The laser head 80 collects the guided laser light, emits the collected laser light from the distal end part 81 to the workpiece 210, and melts the workpiece 210 by the heat of the emitted laser light, so as to machine the workpiece 210. A discharge mechanism of assist gas arranged in the laser head 80 sprays the assist gas such as nitrogen to a part of the melted workpiece 210 to blow out the melted material.

The fixed wall part 31 is provided with an inner cover 40 that covers the laser head 80. A cut part 41 is formed in the inner cover 40. The distal end part 81 of the laser head 80 is exposed only through the cut part 41 to face the workpiece 210. The inner cover 40 covers a part of the laser head 80 other than the exposed distal end part 81.

When any one of the tools 90 is selected as illustrated in FIG. 2, the outer circumference wall part 21 is arranged between the laser head 80 and the workpiece 210 which is being machined by the selected tool 90. The outer circumference wall part 21 thereby blocks coolant, which is spayed to a part of the workpiece 210 contacted by the tool 90, from being splayed to the laser head 80 while the workpiece 210 is machined by the selected tool 90.

Figure 4:
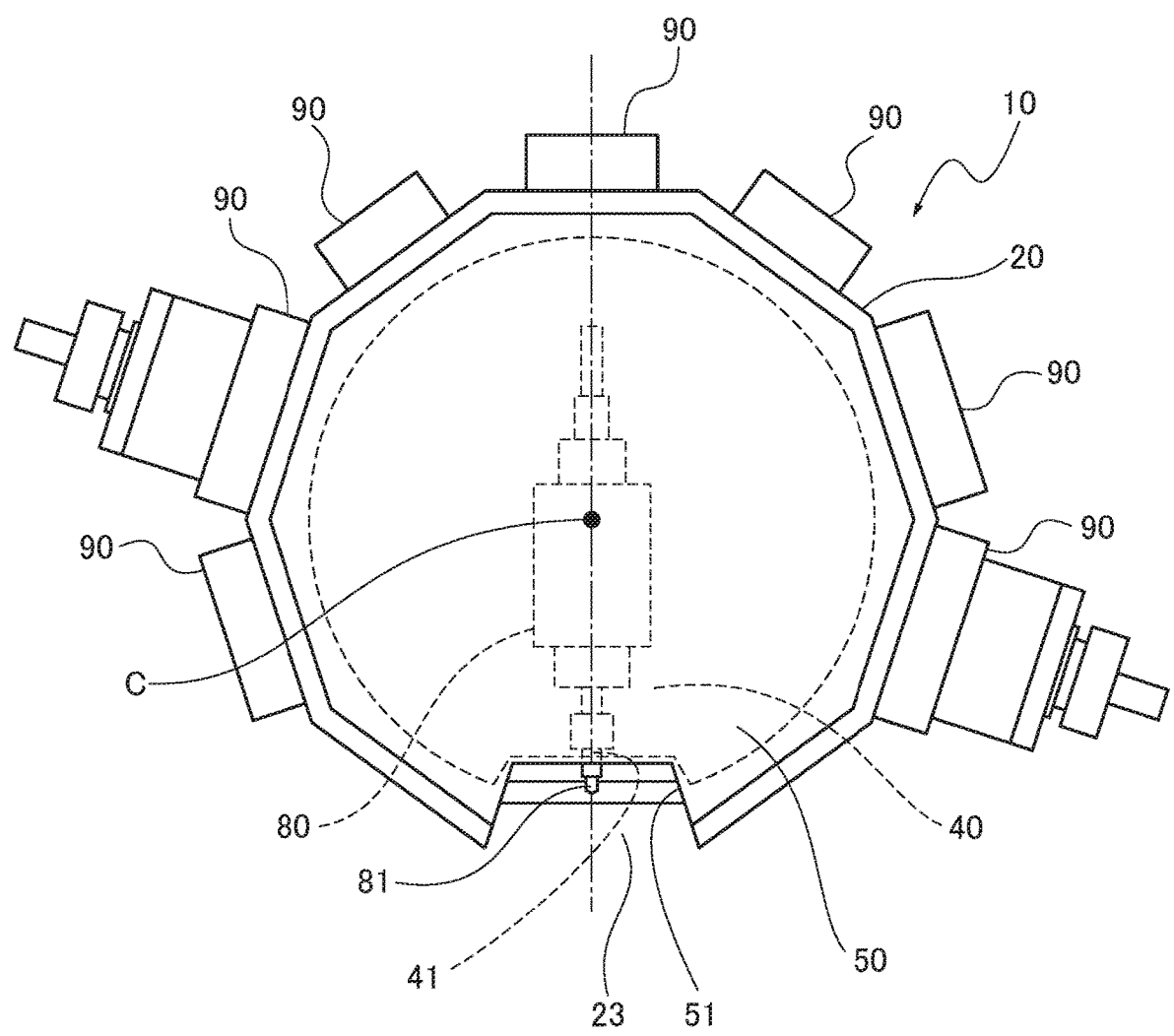
FIG. 4 is a front view of the turret head (when using laser head) as seen from the main spindle side of the automatic lathe.
Figure 5:
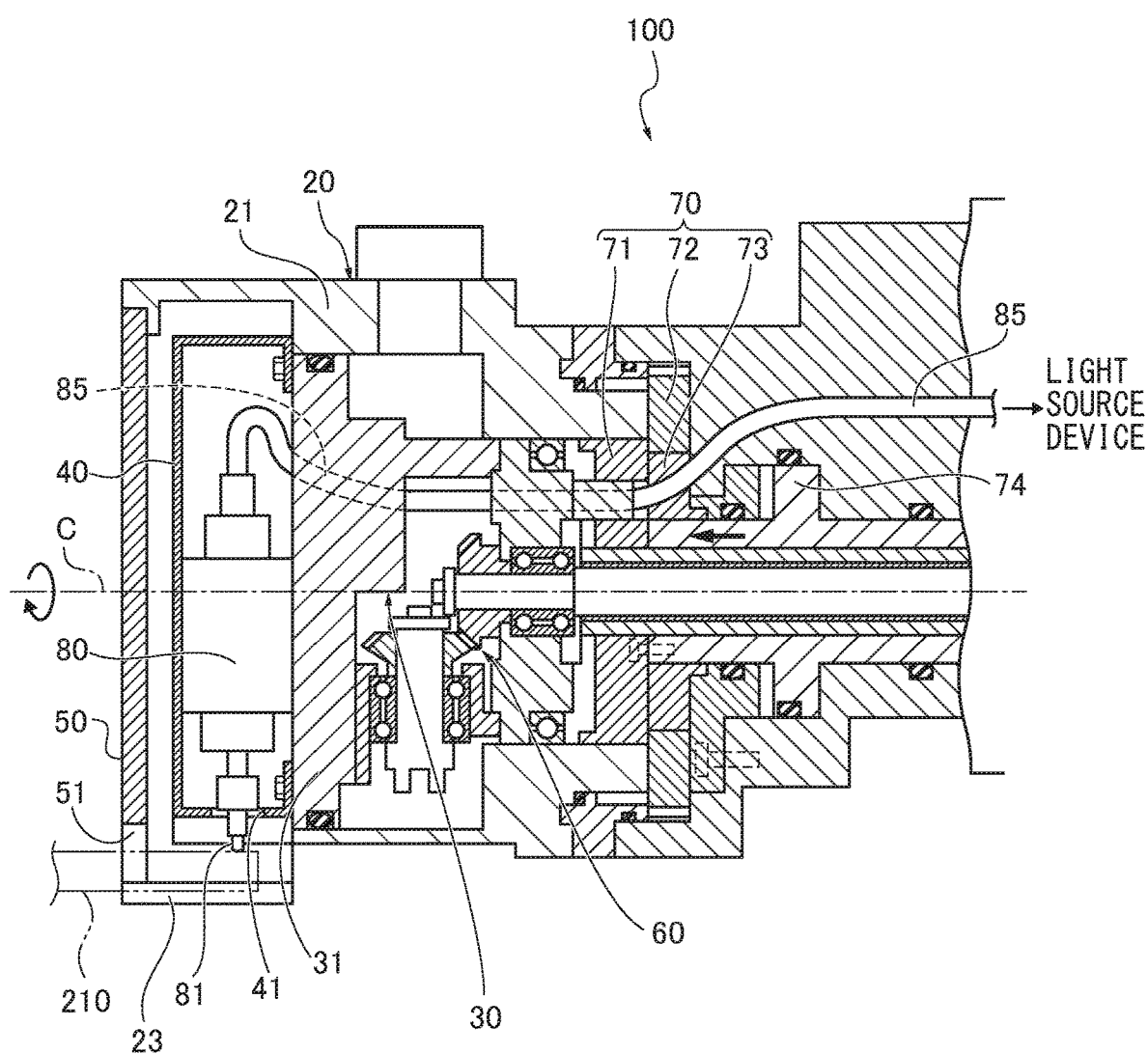
FIG. 5 is a sectional view of the turret head (when using laser head (coupled state)) along the plane including the central axis.

As described above, the opening part is provided in a part of the outer circumference wall part 21 (in particular, part extending forward in central axis C). This opening part (hereinafter referred to as a cut part 23 (a machinable part)) corresponds to one side of the regular decagon of the outer circumference wall part 21 to which the tool 90 is not attached. Accordingly, as illustrated in FIG. 4, when the laser head 80 is selected to machine the workpiece 210, namely, when the cut part 23 is positioned under the laser head 80, as illustrated in FIG. 5, by turning the turning part 20, the cut part 23 overlaps with the cut part 41. The distal end part 81 of the laser head 80 thereby faces the workpiece 210 without being blocked by the outer circumference wall part 21, so that the machining is allowed.

The end plate 50 is arranged close to a leading end surface of the turning part 20 (close to main spindle 200) to be orthogonal to the central axis C, and turns together with the turning part 20 as a part of the turning part 20. The end plate 50 substantially covers the entire surface of the inner region of the outer circumference wall part 21 in the radial direction. However, as illustrated in FIGS. 2, 4, a cut part 51 is formed in the end plate 50. The cut part 51 is formed inside the end plate 50 in the radial direction toward the central axis C, and has a trapezoidal shape including one side corresponding to the part where the cut part 23 is formed. A part of the inner region corresponding to this cut part 51 is not covered in the central axis C direction. In addition, the cut part 51 is formed at a height which exposes the distal end part 81 of the laser head 80 as seen from the forward of the central axis C in the central axis C direction under a state illustrated in FIG. 4 (state in which laser head 80 is selected).

The cut part 51 is formed in the end plate 50 to communicate with the cut part 23 along the central axis C as described above. Such a configuration makes it possible to arrange the workpiece 210 in the region of the cut part 23 and the region of the cut part 51. Accordingly, when the laser head 80 is selected, the distal end part 81 of the laser head 80 arranged in the inside space of the outer circumference wall part 21 comes close to the workpiece 210 to contact the workpiece 210, as illustrated in FIG. 5. The workpiece 210 is thereby machined by the laser machining device.

The turret tool post 100 includes a double structured cover that covers the laser head 80. The laser head 80 is surrounded by the outer circumference wall part 21 and the end plate 50 to prevent the coolant from being splayed during the machining by the tool 90. However, as illustrated in FIGS. 3A, 5, the laser head 80 is additionally surrounded by the inner cover 40 in the inside space surrounded by the outer circumference wall part 21 and the end plate 50. As described above, the laser head 80 is covered by a turning outer cover including the outer circumference wall part 21 and the end plate 50 and a non-turning inner cover including the inner cover 40.

When the laser head 80 is selected, the cut part 23 and the cut part 51 of the outer cover are aligned with the cut part 41 of the inner cover (refer to FIGS. 4, 5), and operate as one cut part formed in the turret head 10. The workpiece 210 is thereby machined by the laser head 80.

On the other hand, when any one of the tools 90 is selected, the end plate 50 rotates together with the turning part 20, and the cut part 23 of the outer cover is misaligned with the cut part 41 of the inner cover (refer to FIGS. 2, 3A). The inner cover 40 blocks between the cut part 23 and the laser head 80. As a result, even when the coolant in the machining by the tool 90 enters the inside space through the cut part 23, the coolant does not reach the cut part 41 formed at an angle position (lowest part) different from the cut part 23. The inner cover in addition to the outer cover makes it possible to further prevent the coolant from spraying the entire laser head 80 including the distal end part 81 exposed downward from the cut part 41 of the inner cover.

With the cut part 23 of the outer circumference wall part 21 and the cut part 51 of the end plate 50 in the turret tool post 100 of the present embodiment, the distal end part 81 of the laser head 80 can be arranged, in the inside space covered by the outer cover, at a position higher than that of a turret tool post without the cut part 23 and the cut part 51. As a result, if the coolant largely enters the inside space covered by the outer cover through the cut part 23 and the cut part 51 of the outer cover to flow downward, and is accumulated in the inner surface of the outer circumference wall part 21 as a bottom surface, the distal end part 81 arranged at a relative high position makes the accumulated coolant difficult to adhere to the distal end part 81.

Figure 6:
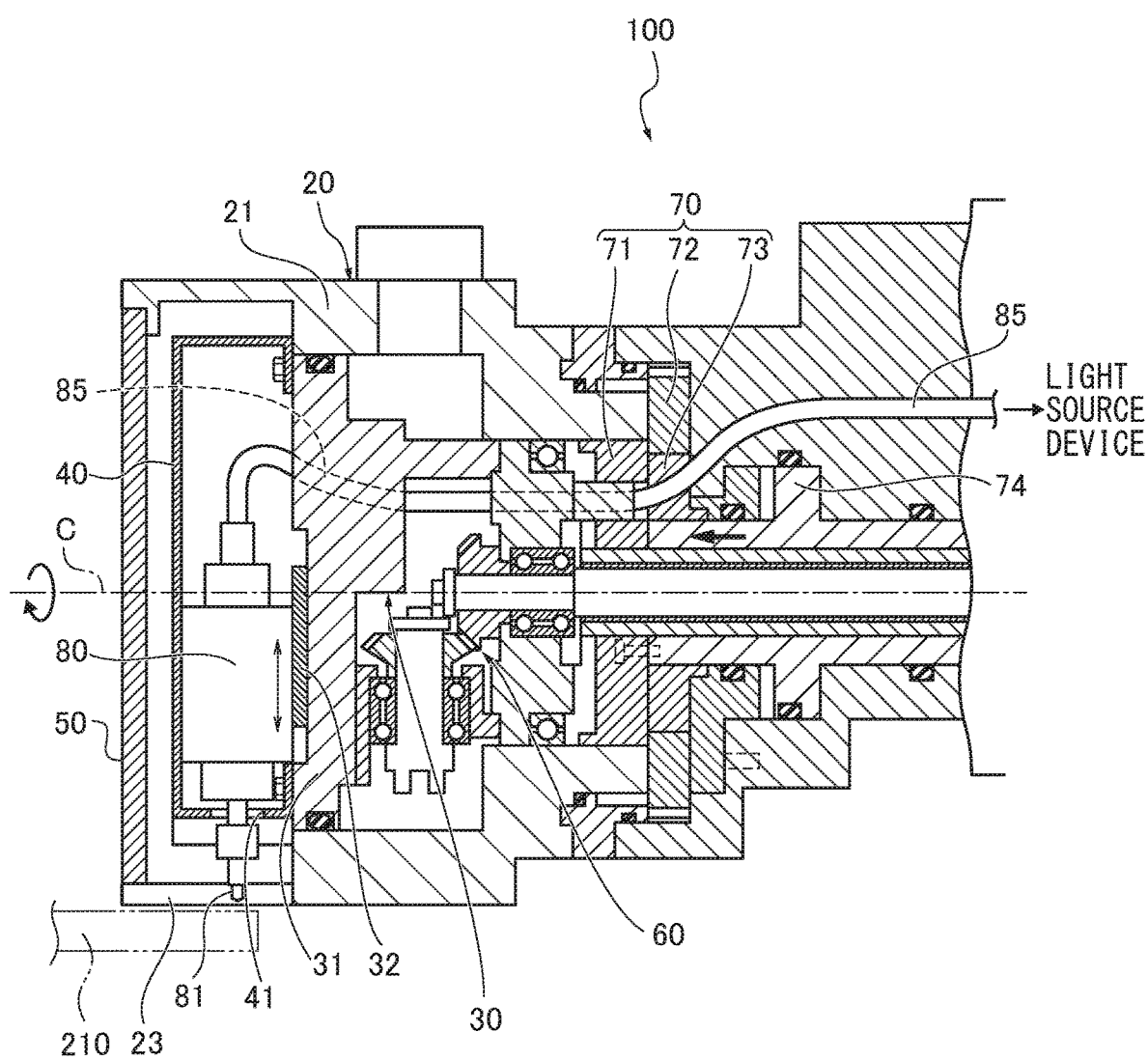
FIG. 6 is a sectional view corresponding to FIG. 5 and illustrating a modified example in which the laser head is attached to a fixed wall part through a moving part for moving the laser head in an illustrated vertical direction.

As illustrated in FIG. 6, instead of forming the cut part 51 in the end plate 50, a moving part 32 that moves the laser head 80 to be close to the workpiece 210 may be provided in the fixed wall part 31, and the laser head 80 may be attached to the moving part 32. According to the turret tool post 100 as configured above, the moving part 32 moves the laser head 80 downward. The distal end part 81 of the laser head 80 can be thereby moved through the cut part 23 to be close to the workpiece 210 provided under the lowest part of the end plate 50 in the machining by the laser head 80 without forming the cut part 51 in the end plate 50.

After the machining by the laser head 80 is completed, the laser head 80 can be maintained at a higher position by moving the laser head 80 upward with the moving part 32 under a state in which the distal end part 81 is separated from the workpiece 210.

As one example of another tool, the laser machining device is applied, and as one example of the machining body to which the cable is connected, the laser head 80 is applied in the turret tool post 100 of the present embodiment. However, the turret tool post according to the present disclosure is not limited to this embodiment. Namely, in the turret tool post according to the present disclosure, for example, a high frequency spindle may be applied as the machining body instead of the laser head 80.

The high frequency spindle rotates at a super high speed (for example, several hundred thousand revolutions per minute). A power source cable (power source code) connected to a power source is connected to the high frequency spindle. It is therefore necessary to prevent the power source cable from being twisted when the turning part turns. In the turret tool post according to the present disclosure, as is exampled in the above laser head, as the machining body and the cable are fixed to the non-turning part, the cable is not twisted even when the turning part turns. The effect by the present disclosure is achieved by a turret tool post in which the high frequency spindle to which the power source cable is connected is fixed to the non-turning part.

The machining body to which the cable is connected is not limited to the laser head and the high frequency spindle. The cable connected to the machining body includes pipe such as a tube.

In the above turret tool post 100, the laser head 80 is covered double by the turning outer cover and the non-turning inner cover. However, the turret tool post of the present disclosure is not limited to the double cover that covers the machining body (for example, laser head 80) in a special tool as long as the turret tool post includes at least the outer cover.

What is claimed is:
1. A turret tool post comprising:
   a turnable sleeve comprising an outer circumference wall having an outer circumference surface and an inner surface, wherein a plurality of first machining tools configured for machining a workpiece are mounted on the outer circumference surface, the turnable sleeve configured to turn for selecting any one of the first machining tools; and
   a non turnable housing positioned inside the turnable sleeve within the inner surface of the turnable sleeve, the non-turnable housing being fixed in position and unturnable with respect to the turret tool post, wherein a machining body of a second machining tool extends in the non-turnable housing and is mounted to the non-turnable housing, the machining body configured to machine the workpiece, the second machining tool being a separate machining tool from the first machining tools,
   wherein the turnable sleeve comprises an opening, the turnable sleeve configured to turn to a predetermined to position the opening relative to the machining body for the machining body to directly face the workpiece through the opening for the machining body to machine the workpiece.
2. The turret tool post according claim 1, wherein
   the turret tool post comprises an inner cover that is fixed to the non turnable housing and is configured to block the machining body of the second machining tool from the opening when one of the plurality of first machining tools is selected for machining the workpiece.
3. The turret tool post according to claim 2, wherein
   the turnable sleeve is provided with a cut part that communicates with the opening along a central axis of the turnable sleeve.
4. The turret tool post according to claim 1, wherein
   the non turnable housing includes a moving part that moves the machining body of the second machining tool through the opening toward the workpiece in a direction perpendicular to a central axis of the turnable sleeve.

5. The turret tool post according to claim 1, wherein the machining body of the second machining tool includes a laser head configured to emit laser light to machine the workpiece.

* * * * *